(12) United States Patent
Bujard et al.

(10) Patent No.: US 7,943,194 B2
(45) Date of Patent: May 17, 2011

(54) PROCESS FOR PREPARING FLAKE-FORM PIGMENTS BASED ON ALUMINUM AND ON SIOZ(Z=0.7-2.0) COMPRISING FORMING A LAYER OF SEPARATING AGENT

(75) Inventors: Patrice Bujard, Courtepin (CH); Ulrich Berens, Binzen (DE)

(73) Assignee: BASF SE, Ludwigshafen (DE)

( * ) Notice: Subject to any disclaimer, the term of this patent is extended or adjusted under 35 U.S.C. 154(b) by 822 days.

(21) Appl. No.: 11/659,769

(22) PCT Filed: Aug. 15, 2005

(86) PCT No.: PCT/EP2005/053994
§ 371 (c)(1),
(2), (4) Date: Feb. 8, 2007

(87) PCT Pub. No.: WO2006/021528
PCT Pub. Date: Mar. 2, 2006

(65) Prior Publication Data
US 2007/0259182 A1 Nov. 8, 2007

(30) Foreign Application Priority Data
Aug. 23, 2004 (EP) .................................... 04104041

(51) Int. Cl.
*B05D 3/00* (2006.01)
*C23C 16/06* (2006.01)
*C23C 16/28* (2006.01)

(52) U.S. Cl. ............... 427/250; 427/255.6; 427/255.7; 427/331; 427/333; 427/352

(58) Field of Classification Search ............... 427/248.1, 427/250, 255.6, 255.7, 331, 333, 352
See application file for complete search history.

(56) References Cited

U.S. PATENT DOCUMENTS

| | | | | |
|---|---|---|---|---|
| 6,270,840 | B1 * | 8/2001 | Weinert | 427/251 |
| 7,157,116 | B2 * | 1/2007 | Weinert | 427/248.1 |
| 7,256,425 | B2 * | 8/2007 | Weinert et al. | 257/77 |
| 7,273,522 | B2 * | 9/2007 | Bujard et al. | 106/481 |
| 7,291,216 | B2 * | 11/2007 | Bujard | 106/415 |
| 7,452,597 | B2 * | 11/2008 | Bujard | 428/402 |
| 7,517,404 | B2 * | 4/2009 | Bujard et al. | 106/481 |
| 2004/0131776 | A1 * | 7/2004 | Weinert | 427/255.7 |
| 2005/0161678 | A1 | 7/2005 | Weinert et al. | 257/77 |
| 2005/0252410 | A1 | 11/2005 | Bujard et al. | 106/31.9 |
| 2005/0287090 | A1 | 12/2005 | Bujard | 424/63 |
| 2006/0027139 | A1 | 2/2006 | Bujard et al. | 106/31.65 |
| 2006/0034787 | A1 | 2/2006 | Bujard | 424/63 |
| 2006/0042507 | A1 | 3/2006 | Bujard et al. | 106/415 |
| 2006/0048676 | A1 | 3/2006 | Bujard | 106/415 |
| 2006/0099420 | A1 | 5/2006 | Bujard | 428/403 |
| 2006/0111466 | A1 | 5/2006 | Bujard et al. | 523/160 |
| 2006/0165620 | A1 | 7/2006 | Bujard et al. | 424/63 |
| 2006/0257662 | A1 | 11/2006 | Bujard et al. | 428/404 |

FOREIGN PATENT DOCUMENTS

| | | |
|---|---|---|
| WO | 00/69975 | 11/2000 |
| WO | 02/094945 | 11/2002 |
| WO | 03/106569 | 12/2003 |
| WO | 2004/020530 | 3/2004 |
| WO | 2004/052999 | 6/2004 |
| WO | 2004/065295 | 8/2004 |

* cited by examiner

*Primary Examiner* — H. (Holly) T Le
(74) *Attorney, Agent, or Firm* — Qi Zhuo

(57) ABSTRACT

The present invention relates to process for the production of plane-parallel platelets, comprising the steps of: a) vapor-deposition of a separating agent onto a carrier to produce a separating agent 5 layer, b) vapor-deposition of at least one product layer onto the separating agent layer, and c) dissolution of the separating agent layer in a solvent and production of a suspension in which the at least one product layer is present in the form of plane-parallel platelets, wherein the separating agent is selected from the group consisting of anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol, and also mixtures of at least two of those substances, especially pentaerythritol ($C(CH_2OH)_4$), trimesic acid (=1,3,5 benzene tricarboxylic acid), DL-alanine, DL-valine, 2,6-20 diaminopurine, ascorbic acid, 1,3,5-benzenetricarboxylic acid, o-acetylsalicyclic acid, diphenic acid, terephthalic acid, pyrogallol, cyanuric acid, hexamethyltetramine (urotropin), fumaric acid, and 4-acetylbenzoic acid and also mixtures of at least two of those substances.

7 Claims, No Drawings

PROCESS FOR PREPARING FLAKE-FORM PIGMENTS BASED ON ALUMINUM AND ON SIOZ(Z=0.7-2.0) COMPRISING FORMING A LAYER OF SEPARATING AGENT

The present invention relates to a process for the production of plane-parallel platelets, comprising the steps:
a) vapour-deposition of a separating agent onto a carrier to produce a separating agent layer,
b) vapour-deposition of at least one product layer onto the separating agent layer, and
c) dissolution of the separating agent layer in a solvent and production of a suspension in which the at least one product layer is present in the form of plane-parallel platelets, characterized in that specific separating agents are used. The aluminum flakes obtained by the process can be used in paints, electrostatic coatings, in ink-jet printing, cosmetics, coatings, printing inks, plastics materials, in glazes for ceramics and glass, in security printing and in the production of interference pigments.

Aluminum flakes on which SiO or $SiO_2$ protective layers are vapor-deposited by means of PVD (physical vapor deposition) are known.

WO00/69975 discloses aluminum flakes comprising
(a) a layer of a dielectric material, such as silicon monoxide or silicon dioxide,
(b) a layer of a metal, such as aluminum,
(c) a layer of a dielectric material, such as silicon monoxide or silicon dioxide. The thickness of the layers of the dielectric is such that the optical properties of the metal are not significantly affected, that is to say is in the range of from 10 to 20 nm.

U.S. Pat. No. 6,013,370 discloses aluminum flakes comprising
(a) a layer of a dielectric material, such as silicon dioxide,
(b) a layer of a metal, such as aluminum,
(c) a layer of a dielectric material, such as silicon dioxide. The thickness of the layers of the dielectric is such that the optical properties of the metal are not significantly affected, that is to say is in the range of from 50 to 200 nm.

In Example 2 of WO00/24946, the manufacture of SiO-coated aluminum flakes is described. According to the description, the thickness of the SiO protective layer is 15 nm or less.

A discontinuous multi-step method is used for the production of optically variable pigment platelets, such as are used for increasing the security of bank notes against forgery (EP 227 423). U.S. Pat. No. 5,278,590 describes a similar method. In U.S. Pat. No. 4,168,985 (Venis), U.S. Pat. No. 3,123,489 (Bolomey et al.) and U.S. Pat. No. 5,156,720 (Rosenfeld), the separating agents used are inorganic salts, which are dissolved in a subsequent step using water as solvent, as a result of which the product layer is present in the form of flakes in aqueous suspension.

According to WO 99/65618 (Kittler), waxy substances are vaporised and then, under the same vacuum, the product layer is vapour-deposited or sputtered. After a large number of revolutions of the carrier, usually a rotating cylinder, the arrangement of n layers (wax/metal) is scraped off. In a further step, outside the vacuum apparatus, the wax is washed out of the collected paste by means of solvent(s). In all cases, large amounts of solvent(s), which have to be either reprocessed or disposed of subsequently, are required in order to wash the product.

Examples of the vaporisability of organic substances for such layers by the PVD method are described in U.S. Pat. No. 6,101,316 (Nagashima et al.), DE-OS 2 706 392 (Ikeda et al.), DE-OS 2 009 080 (Davies et al.) and U.S. Pat. No. 3,547,683 (Williams, Hayes).

According to those publications, addition polymers and condensation polymers, silicone resins, phthalocyanine dyes and even natural materials such as colophony are vaporised. A further method by means of which organic polymer layers are produced using the PVD method is described in U.S. Pat. No. 5,440,446 (Shaw), wherein a liquid monomer is vaporised, condensed in wet form on a passing film carrier on a cooled roller and, on the same roller, immediately polymerised by electron beam bombardment, as a result of which a solid film forms. Subsequently, a metal layer, usually aluminium, is vapour-deposited.

U.S. Pat. No. 4,382,985 discloses the deposition of a polymer film onto a substrate by means of plasma polymerisation of fluoroalkyl acrylate monomers. From U.S. Pat. No. 5,904,958 it is known to deposit organic monomers on substrates by means of vacuum methods and subsequently to carry out polymerisation. From JP 11-140 626 A (Patent Abstracts of Japan) it is known to apply a thin film of triazine monomers to a substrate, for example by means of a vacuum method, and then to carry out polymerisation.

The aim of all those methods is to produce firmly adherent protective layers. Rapid solubility in solvents is not desired and would even be damaging.

DE 199 33 230 A1 and DE 199 35 181 A1 (Moosheimer et al.) disclose release layers or protective layers comprising organic monomers that are preferably water-soluble, especially triazine monomers. Such layers can be dissolved away using warm water, which is, however, not suitable for the method according to the invention, because of the difficulty of removing it from the products.

WO02/094945 relates to a method for the production of plane-parallel platelets, comprising the steps:
a) vapour-deposition, at a pressure below atmospheric pressure, of a separating agent onto a carrier to produce a separating agent layer,
b) vapour-deposition, at a pressure below atmospheric pressure, of at least one product layer onto the separating agent layer, and
c) dissolution of the separating agent layer in a solvent and production of a suspension in which the at least one product layer is present in the form of plane-parallel platelets, in which method the separating agent is selected from the group consisting of anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol, and also mixtures of at least two of those substances.

The problem of the present invention was accordingly to make available a substantially improved method, compared to the above-mentioned prior art, for the production of plane-parallel platelets by using the PVD method, such as improved surface characteristics of the products and, hence, better mechanical and optical properties.

Suitable separating agents should be capable preferably of being used in a continuous PVD method and especially of being vaporised in an industrial context in amounts of more than 1 kg/h with little thermal decomposition. The amounts of non-condensable cracked gases that form should be substantially less than the capacities of the high-vacuum pumps customarily used for such methods. Most suitable separating agents should feature a vapor pressure of at least 5 mbar, preferably 10 mbar below the melting point.

The separating agents should be condensable in the form of a smooth layer at from 0° to about 50° C., preferably at room temperature, on a moving carrier passing by continuously. They should react as little as possible with a product layer vapour-deposited in accordance with the invention onto the separating agent layer.

The separating agent layer between the carrier and the product layer, from which the plane-parallel platelets are obtained, should be capable of dissolving as quickly as possible. Also, the solvent required for dissolution of the separating agent layer must not react chemically with the product layer, which then breaks up into fine flakes. The time available is determined by the maximum dwell time in the dissolution zone. In the case of industrial carrier speeds of from 50 to 250 m/min, this time is typically from 5 to 20 seconds, especially from 5 to 10 seconds.

Accordingly, the present invention relates to process for the production of plane-parallel platelets, comprising the steps:
a) vapour-deposition of a separating agent onto a carrier to produce a separating agent layer,
b) vapour-deposition of at least one product layer onto the separating agent layer, and
c) dissolution of the separating agent layer in a solvent and production of a suspension in which the at least one product layer is present in the form of plane-parallel platelets, wherein the separating agent is selected from the group consisting of anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol, and also mixtures of at least two of those substances, especially pentaerythritol ($C(CH_2OH)_4$), trimesic acid (=1,3,5 benzene tricarboxylic acid), DL-alanine, DL-valine, 2,6-diaminopurine, ascorbic acid, 1,3,5-benzenetricarboxylic acid, o-acetylsalicyclic acid, diphenic acid, terephthalic acid, pyrogallol, cyanuric acid, hexamethyltetramine (urotropin), fumaric acid, and 4-acetylbenzoic acid and also mixtures of at least two of those substances.

According to the present invention the wording "dissolution of the separating agent layer in a solvent" means that the separating agent layer is either solvent-soluble, or dissolvable.

The organic separating agent should be sublimable under vacuum, should have a melting point between 50 to 600° C., especially higher than ca. 150° C., very especially higher than 200° C., most preferably between 250 to 500° C. The layer obtained by sublimation of the separating agent under vacuum (at a pressure $\leq 1*10^{-3}$ mbar) should be soluble in an organic solvent, preferably a ketone, like acetone, or an alcohol, like methanol, or ethanol, and should be most preferably water soluble.

Examples of preferred separating agents are cyanuric acid, especially pentaerythritol, trimesic acid (=1,3,5 benzene tricarboxylic acid), DL-alanine, DL-valine, 2,6-diaminopurine, ascorbic acid, 1,3,5-benzenetricarboxylic acid, o-acetylsalicyclic acid, diphenic acid, terephthalic acid, pyrogallol, hexamethyltetramine (urotropin), fumaric acid, and 4-acetylbenzoic acid and also mixtures of at least two of those substances. 1,3,5-benzenetricarboxylic acid, terephthalic acid, hexamethyltetramine (urotropin) and 4-acetylbenzoic acid are especially preferred and pentaerythritol is most preferred.

The preferred separating agent is water soluble, wherein the solubility of the separating agent can optionally be improved by increase of pH, for example by addition of a base. The above-mentioned separating agents should meet the following conditions:

They are solid, non-polymerisable organic compounds having vapour pressures of less than $10^{-3}$ Pa at 25° C. (fundamental requirement in order to be able to use a material without self-vaporisation at room temperature in a vacuum of <0.1 Pa).

The separating agent layer is rapidly soluble in water, optionally in the presence of a base, or industrial solvents such as, for example, isopropanol, ethyl acetate, butanol, ethanol, petroleum spirit, methyl isobutyl ketone, methyl ethyl ketone, trichloroethylene, or 1,2-dichloroethane.

Below their melting points, the separating agents have vapour pressures of from 10 to 1000 Pa. As a result, use of the separating agents according to the invention results in sublimative vaporisation below the triple point of the substances and avoids technically disadvantageous spatter formation.

The preferred separating agents have, moreover, high thermal stability.

In addition, these substances condense in amorphous form. This is important for obtaining highly reflecting metal layers that are to be vapour-deposited onto the separating agent layer. It is advantageous to overheat the separating agent, such as pentaerythrite. That means, the vapor pressure of pentaerythrite divided by the saturated vapor pressure of pentaerythrite is below 1. By doing so very smooth and uniform separating agent layers can be obtained. The product layer can consist of any material which sublimable under vacuum and can be processed according to the process of the present invention. The product layer can consist of a mixture of materials (cf. WO04/065492). The product deposited by physical vapor deposition (PVD) can be composed of more than one layers, for example 2, 3, or 5 layers (WO04/052999). In preferred embodiments of the present invention the products of the process are plane-parallel metal platelets, optionally comprising further layers, or plane-parallel platelets of a dielectric material having a "high" or "low" refractive index, optionally comprising further layers.

Preferred examples of metals are Al, Cu, Mo, V, Ag, Cr, Zr, Nb, Ni, Fe, Co, Ti, Au, Pd, W, Hf, Rh, Ir, Pt, Cd or alloys thereof, such as chromium-nickel, iron-nickel, iron-chromium and nickel-cobalt, wherein Al or alloys thereof are most preferred. Examples of products comprising more than one layers are given below. Examples of dielectric materials having a "high" or "low" refractive index and being sublimable under vacuum are described below. $MgF_2$ flakes are preferred. $SiO_z$ flakes are most preferred.

The present invention is illustrated in more detail on the basis of Al flakes, $SiO_z$ coated aluminum flakes and $SiO_z$ flakes, but is not limited thereto.

In a preferred embodiment the process of the present invention is used to prepare aluminum flakes.

The aluminium flakes are preferably obtained by means of a process comprising the following steps:

a) vapor-deposition of a separating agent onto a carrier to produce a separating agent layer,
b) vapor-deposition of an Al layer onto the separating agent layer,
c) dissolution of the separating agent layer in a solvent and
d) separation of the aluminum flakes from the solvent.

The separating agent is preferably one, which is readily soluble in an organic solvent and which does not react with the aluminium.

The process mentioned above makes available aluminium flakes that have a high degree of plane parallelism and a defined thickness in the region of ±10%, preferably ±5%, of the average thickness.

The aluminium flakes have an average diameter of at least 2 µm, especially from 2 to 20 µm, more especially from 3 to 15 µm, and most preferred from 5 to 15 µm. The thickness of the aluminium flakes is generally from 10 to 150 nm, especially from 10 to 100 nm, and more especially from 30 to 60 nm.

Such aluminium flakes can be further processed to pigments with optical variable properties by applying further layers on the aluminium substrate.

They can be coated on the entire surface with $Fe_2O_3$, wherein the $Fe_2O_3$ has preferably a thickness of 10 to 50 nm, or they can be successively coated with layers of $SiO_2$ (thickness=250 to 700 nm) and $Fe_2O_3$ (thickness=10 to 40 nm).

In a preferred embodiment the present invention relates to a process for the production of plane-parallel platelets of aluminum (aluminum) flakes, comprising
(A1) a layer consisting of $SiO_z$,
(B) a layer consisting of aluminum on the layer (A1) and
(A2) a layer consisting of $SiO_z$ on the layer (B), wherein $0.70 \leq z \leq 2.0$, comprising the steps:
a) vapor-deposition of a separating agent onto a carrier to produce a separating agent layer,
b1) vapor-deposition of an $SiO_y$ layer onto the separating agent layer,
b2) vapor-deposition of an Al layer onto the $SiO_y$ layer,
b3) vapor-deposition of an $SiO_y$ layer onto the Al layer,
c) dissolution of the separating agent layer in a solvent and
d) separation of the $SiO_y$-coated aluminum flakes from the solvent, wherein $0.70 \leq y \leq 1.95$, preferably $1.0 \leq y \leq 1.80$, most preferably $1.10 \leq y \leq 1.80$, and to aluminum flakes, comprising
(A1) a layer consisting of $SiO_z$,
(B) a layer consisting of aluminum on the layer (A1) and
(A2) a layer consisting of $SiO_z$ on the layer (B), wherein $0.70 \leq z \leq 2.0$, obtainable according to the process.

The separating agent is preferably pentaerythritol and the solvent is preferably water.

The layer thickness of the $SiO_z$ layers (A1) and (A2) is from 10 to 50 nm, especially 20 to 30 nm.

The layer thickness of the layer (B) consisting of aluminum is from 10 to 100 nm, preferably from 30 to 50 nm.

The $SiO_y$-coated aluminum flakes can fundamentally be obtained by means of a process described, for example, in U.S. Pat. No. 6,270,840, WO00/18978, WO02/090613, WO03/90613. The process of the present invention is characterized in that specific separating agents are used.

The silicon oxide layer ($SiO_y$) is formed preferably from silicon monoxide vapor produced in the vaporizer by reaction of a mixture of Si and $SiO_2$ at temperatures of more than 1300° C. A $SiO_y$ layer with $0.70 \leq y \leq 0.99$ is formed preferably by evaporating silicon monoxide containing silicon in an amount up to 20% by weight at temperatures of more than 1300° C.

The Al is evaporated at temperatures of more than 1000° C.

The above-mentioned process makes available silicon oxide coated aluminum flakes having a high plane-parallelism and a defined thickness in the range of ±10%, preferably ±5%, of the average thickness.

The $SiO_y$ layers are obtained by heating a preferably stoichiometric mixture of fine silicon and quartz ($SiO_2$) powder in a vaporizer described, for example, in DE 43 42 574 C1 and in U.S. Pat. No. 6,202,591 to more than 1300° C. under a high vacuum. The reaction product is silicon monoxide gas, which under vacuum is directed directly onto the passing carrier, where it condenses as SiO. Non-stoichiometric mixtures may also be used. The vaporizer contains a charge comprising a mixture of Si and $SiO_2$, $SiO_y$, or a mixture thereof, the particle size of the substances that react with one another (Si and $SiO_2$) being advantageously less than 0.3 mm. The weight ratio of Si to $SiO_2$ is advantageously in the range from 0.15:1 to 0.75:1 (parts by weight); preferably, a stoichiometric mixture is present. $SiO_y$ present in the vaporizer vaporizes directly. Si and $SiO_2$ react at a temperature of more than 1300° C. to form silicon monoxide vapor.

Step d) is usually carried out at a pressure that is higher than the pressure in steps a) and b) and lower than atmospheric pressure.

The (movable) carrier preferably comprises one or more continuous metal belts, with or with-out a polymer coating, or one or more polyimide or polyethylene terephthalate belts. The movable carrier may furthermore comprise one or more discs, cylinders or other rotationally symmetrical bodies, which rotate about an axis.

The $SiO_y$-coated aluminum flakes are separated from the solvent of the separating agent preferably by washing-out and subsequent filtration, sedimentation, centrifugation, decanting or evaporation. Furthermore, the $SiO_y$-coated aluminum flakes may, after washing-out of the dissolved separating agent contained in the solvent, be frozen together with the solvent and subsequently subjected to a process of freeze-drying, during which the solvent is separated off as a result of sublimation below the triple point and the dry flakes remain behind in the form of individual plane-parallel structures.

The condensed silicon suboxide corresponds to the formula $SiO_y$, with $0.95 \leq y \leq 1.8$, preferably with about $1.0 \leq y \leq 1.6$, y values of less than 1 being obtained by means of an excess of silicon in the vaporizer material. Except under an ultra-high vacuum, in industrial vacuums of a few $10^{-2}$ Pa vaporized SiO always condenses as $SiO_y$ with $1 \leq y \leq 1.8$, especially with $1.1 \leq y \leq 1.6$, because high-vacuum apparatuses always contain, as a result of gas emission from surfaces, traces of water vapor which react with the readily reactive SiO at vaporization temperature.

In detail, a separating agent, for example pentaerythritol, followed by layers of silicon suboxide ($SiO_y$), Al and $SiO_y$ are successively vapor-deposited onto a carrier, which may be a continuous metal belt, passing by way of the vaporizers under a vacuum of <0.5 Pa, especially <0.05 Pa. The vapor-deposited thicknesses of separating agent are approximately from 20 to 600 nm, preferably from 300 to 500 nm, those of SiO are, depending on the intended use of the product, from 10 to 500 nm, and those of aluminum are from 10 to 100 nm, especially 30 to 50 nm. On its further course, the belt-form carrier, which is closed to form a loop, runs through dynamic vacuum lock chambers of known construction (cf. U.S. Pat. No. 6,270,840) into a region of from 1 to $5 \times 10^4$ Pa pressure, preferably from 600 to $10^9$ Pa pressure, and especially from $10^3$ to $5 \times 10^3$ Pa pressure, where it is contacted with a separating bath. The temperature of the solvent, such as for example, water, should be so selected that its vapor pressure is in the indicated pressure range. With mechanical assistance, the separating agent layer rapidly dissolves and the product layer breaks up into flakes, which are then in the form of a suspension in the solvent. On its further course, the belt is dried and freed from any contaminants still adhering to it. It runs through a second group of dynamic vacuum lock chambers back into the vaporization chamber, where the process of coating with separating agent and product layer is repeated.

The suspension then obtained in both cases, comprising product structures and solvent with separating agent dissolved therein, is then separated in a further operation in accordance with a known technique. For that purpose, the product structure is first concentrated in the liquid and rinsed several times with fresh solvent in order to wash out the dissolved separating agent. The product, in the form of a solid that is still wet, is then separated off by means of filtration, sedimentation, centrifugation, decanting or evaporation, and is dried.

Separating off the plane-parallel structures after washing-out at atmospheric pressure can be carried out under gentle conditions by freezing the suspension, which has been concentrated to a solids content of approximately 50%, and subjecting it in known manner to freeze-drying at approximately −10° C. and 50 Pa pressure. The dry substance remains behind as product, which can be subjected to the steps of further processing by means of coating or chemical conversion.

Instead of using a continuous belt, it is possible to produce the product using a rotary body by carrying out the steps of vapor-deposition of separating agent and $SiO_y$, Al and $SiO_y$, of separation, and of drying the carrier in accordance with DE-A-199 52 032. The rotary body may be one or more discs, a cylinder or any other rotationally symmetrical body.

A plurality of separating agent and product layers may preferably be vapour-deposited in alternating sequence, one after the other, onto the movable carrier in vacuo before they are removed by dissolution in accordance with step c).

The flakes can optionally be subjected to oxidative heat treatment. For example, air or some other oxygen-containing gas is passed through the platelets, which are in the form of loose material or in a fluidized bed, at a temperature of more than 200° C., preferably more than 400° C. and especially from 400 to 600° C.

Comminution of the fragments of film to pigment size can be effected, for example, by means of ultrasound or by mechanical means using high-speed stirrers in a liquid medium, or after drying the fragments in an air-jet mill having a rotary classifer. Depending on whether the pigment comminution is carried out in a liquid medium or in the dry state, passivation of the free metal surfaces of the aluminium pigment is carried out either during the comminution procedure, or following that procedure, by means of one of the above-mentioned processes. It is also possible for the aluminum flakes or pigments to be subjected to after-coating or after-treatment, which further increases stability to light, weathering and chemicals or facilitates handling of the pigment, especially incorporation into various media. The processes described in EP-A-1084198, EP-A-826745, DE-A-22 15 191, DE-A-31 51 354, DE-A-32 35 017 or DE-A-33 34 598, for example, are suitable as after-treatment or after-coating.

Where appropriate, an $SiO_2$ protective layer can be applied, for which the following method may be used: a soda waterglass solution is metered into a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the waterglass solution, stirring is carried out for 30 minutes.

The pigments according to the invention are distinguished by having a very uniform thickness.

The present invention relates also to aluminum flakes as well as aluminum flakes comprising
(A1) a layer consisting of $SiO_z$,
(B) a layer consisting of aluminum on the layer (A1) and
(A2) a layer consisting of $SiO_z$ on the layer (B), wherein $0.70 \leq z \leq 2.0$, preferably $1.4 \leq z \leq 2.0$, obtained by the process of the present invention.

In a preferred embodiment, the aluminum flakes comprise
(D1) a layer consisting of $SiO_2$,
(B) a layer consisting of aluminum on the layer (D1) and
(D2) a layer consisting of $SiO_2$ on the layer (B).

The layer thickness of the $SiO_z$ or $SiO_2$ layers is from 10 to 50 nm, preferably from 20 to 30 nm, or 50 to 100 nm, not necessarily with the same thickness within the preferred ranges.

The layer thickness of the layer (B) consisting of aluminum is generally from 10 to 100 nm, preferably from 30 to 50 nm.

In a further preferred embodiment the layer thickness of the layer (B) consisting of aluminum is from 40 to 150 nm, preferably ca. 100 nm and the layer thickness of the $SiO_z$ layers (A1) and (A2) is from 50 to 200 nm, especially ca. 100 nm.

The term "$SiO_z$ with $0.70 \leq z \leq 2.0$" means that the molar ratio of oxygen to silicon at the average value of the silicon oxide layer is from 0.70 to 2.0. The composition of the silicon oxide layer can be determined by ESCA (electron spectroscopy for chemical analysis). The stoichiometry of silicon and oxygen of the silicon oxide substrate can be determined by RBS (Rutherford-Backscattering).

The term "$SiO_y$ with $0.70 \leq y \leq 1.95$" means that the molar ratio of oxygen to silicon at the average value of the silicon oxide layer is from 0.70 to 1.95. The composition of the silicon oxide layer can be determined by ESCA (electron spectroscopy for chemical analysis). The stoichiometry of silicon and oxygen of the silicon oxide substrate can be determined by RBS (Rutherford-Backscattering).

According to the present invention the term "aluminum" comprises aluminum and alloys of aluminum. Alloys of aluminum are, for example, described in G. Wassermann in Ullmanns Enzyklopädie der Industriellen Chemie, 4. Auflage, Verlag Chemie, Weinheim, Band 7, S. 281 to 292. Especially suitable are the corrosion stable aluminum alloys described on page 10 to 12 of WO00/12634, which comprise besides aluminum silicon, magnesium, manganese, copper, zinc, nickel, vanadium, lead, antimony, tin, cadmium, bismuth, titanium, chromium and/or iron in amounts of less than 20% by weight, preferably less than 10% by weight.

The aluminum flakes have an aluminum core with two substantially parallel faces, the distance between which faces is the shortest axis of the core, the parallel faces, but not the side faces, being coated with silicon oxide. Furthermore, the aluminum flakes coated with silicon oxide have a length of from 2 μm to 5 mm, a width of from 2 μm to 2 mm and a thickness of from 30 to 800 nm and a length to thickness ratio of at least 2:1. The aluminum flakes preferably have lengths and widths of from 1 to 60 μm, preferably from 2 to 40 μm, most preferably from 5 to 20 μm. The length to thickness ratio is from about 2:1 to about 800:1. The length to width ratio is from 3:1 to 1:1.

The silicon oxide/aluminum flakes are not of a uniform shape. Nevertheless, for purposes of brevity, the flakes will be referred to as having a "diameter." The silicon oxide/aluminum flakes have a high plane-parallelism and a defined thickness in the range of ±10%, especially ±5%, of the average thickness. The silicon oxide/aluminum flakes have a thickness of from 30 to 800 nm, very especially from 70 to 110 nm. It is presently preferred that the diameter of the flakes be in a preferred range of about 2-40 μm with a more preferred range of about 5-20 μm. Thus, the aspect ratio of the flakes of the present invention is in a preferred range of about 40 to 290.

For increasing the stability to weathering and light fastness, the $SiO_y$ layer with $0.70 \leq y \leq 1.8$ can be oxidized, or converted into an $SiO_2$ layer, with air or another oxygen-containing gas at a temperature of more than 200° C., preferably more than 400° C. and less than 600° C. For example, aluminum flakes coated with $SiO_y$ (y=1) can be converted into aluminum flakes coated with $SiO_z$ (z=1.40 to 2.00) by heating at ≦500° C. for several hours in an oxygen-containing atmosphere. In that process, if the entire $SiO_y$ is not converted into $SiO_2$, an $SiO_2$ layer forms on the surface of the $SiO_y$ layer, with y gradually decreasing towards the aluminum layer.

A further preferred embodiment of the present invention therefore relates to aluminum flakes comprising
(C1) a layer consisting of $SiO_2$,
(A1) a layer consisting of $SiO_y$ on the layer (C1),
(B) a layer consisting of aluminum on the layer (A1),
(A2) a layer consisting of $SiO_y$ on the layer (B) and
(C2) a layer consisting of $SiO_2$ on the layer (A2), wherein $0.70 \leq y \leq 1.95$, preferably $1.0 \leq y \leq 1.8$, most preferably $1.4 \leq y \leq 1.8$.

The layer thickness of the layer (B) consisting of aluminum is generally from 10 to 100 nm, preferably from 30 to 50 nm.

The layer thickness of the layers (A1) and (A2) consisting of $SiO_z$, the layer thickness of the layers (D1) and (D2) consisting of $SiO_2$, the layer thickness of the layer (A1) consisting of $SiO_y$ and of the layer (C1) consisting of $SiO_2$ and the layer thickness of the layer (A2) consisting of $SiO_y$ and of the layer (C2) consisting of $SiO_2$ is from 10 to 50 nm, preferably from 20 to 30 nm, or 50 to 200 nm, when the aluminum flakes are the end product, and from 200 to 500 nm when the aluminum flakes are an intermediate for interference pigments.

The aluminum flakes according to the invention can be used in the applications that are customary for known aluminum flakes. Examples that may be mentioned are the use of the aluminum flakes according to the invention in paints, electrostatic coatings, in ink-jet printing, cosmetics, coatings, printing inks, plastics materials, in glazes for ceramics and glass and in security printing.

It is also possible for the finished aluminum flakes to be subjected to after-coating or after-treatment, which further increases the stability to light, weathering and chemicals or facilitates handling of the pigment, especially incorporation into various media. The processes described in EP-A-477433, EP-A-826745 or EP-A-1084198, for example, are suitable as after-treatment or after-coating.

The aluminum flakes can furthermore be converted into interference pigments by being coated with further layers. The fundamental structure of such pigments is described, for example, in the following patents: EP-A-571836, EP-A-708154, EP-A-768343, EP-A-1025168 and WO00/34395.

In order to be able to use the aluminium flakes (flake-form aluminium) in aqueous compositions, it is necessary for those pigments to be protected against corrosion by water. According to R. Besold, Aluminiumpigmente für wässrige Beschichtungen—Widerspruch oder Wirklichkeit?, Farbe +Lack 97 (1991) 311-314, a large number of procedures, which can be divided into two groups, are known for the stabilisation of aluminium pigments:

adsorption of corrosion inhibitors on the pigment surface
phosphoric acid esters: DE-A-3020073, EP-A-170474, EP-A-133644, U.S. Pat. Nos. 4,565,716, 4,808,231,
phosphates and phosphites: U.S. Pat. Nos. 4,565,716, 4,808,231, EP-A-240367,
vanadates: EP-A-305560, EP-A-104075,
chromates: U.S. Pat. Nos. 2,904,523, 4,693,754, EP-A-259592,
dimeric acids: DE-A-3002175, and
encapsulation of the pigments with a continuous inorganic protective layer:
$SiO_2$: U.S. Pat. Nos. 2,885,366, 3,954,496,
$Fe_2O_3$: DE-A-3003352,
$TiO_2$: DE-A-3813335,
or organic protective layer:
DE-A-3630356, DE-A-3147177, EP-A-477-433, especially resins modified with phosphoric acid: EP-A-170474, CA-A-1,273,733, AT-A-372696, DE-A-3807588, EP-A-319971.

In an especially preferred embodiment, the interference pigments on the basis of the silicon oxide/metal substrate comprises a further layer of a dielectric material having a "high" refractive index, that is to say a refractive index greater than about 1.65, preferably greater than about 2.0, most preferred greater than about 2.2, which is applied to the entire surface of the silicon oxide/aluminum substrate. Examples of such a dielectric material are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$), or combinations thereof. The dielectric material is preferably a metal oxide. It being possible for the metal oxide to be a single oxide or a mixture of oxides, with or without absorbing properties, for example, $TiO_2$, $ZrO_2$, $Fe_2O_3$, $Fe_3O_4$, $Cr_2O_3$, iron titanate, iron oxide hydrates, titanium suboxides, or ZnO, with $TiO_2$ being especially preferred. On top of the $TiO_2$ layer, a layer of a metal oxide of low refractive index can be applied. Nonlimiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, or EP-A-733,919, the disclosure of which is incorporated herein by reference. $SiO_2$, $Al_2O_3$, AlOOH, $B_2O_3$, or a mixture thereof, are preferred. $SiO_2$ is most preferred.

The metal oxide layers can be applied by CVD (chemical vapour deposition) or by wet chemical coating. The metal oxide layers can be obtained by decomposition of metal carbonyls in the presence of water vapour (relatively low molecular weight metal oxides such as magnetite) or in the presence of oxygen and, where appropriate, water vapour (e.g. nickel oxide and cobalt oxide). The metal oxide layers are especially applied by means of oxidative gaseous phase decomposition of metal carbonyls (e.g. iron pentacarbonyl, chromium hexacarbonyl; EP-A-45 851), by means of hydrolytic gaseous phase decomposition of metal alcoholates (e.g. titanium and zirconium tetra-n- and -iso-propanolate; DE-A-41 40 900) or of metal halides (e.g. titanium tetrachloride; EP-A-338 428), by means of oxidative decomposition of organyl tin compounds (especially alkyl tin compounds such as tetrabutyltin and tetramethyltin; DE-A-44 03 678) or by means of the gaseous phase hydrolysis of organyl silicon compounds (especially di-tert-butoxyacetoxysilane) described in EP-A-668 329, it being possible for the coating operation to be carried out in a fluidised-bed reactor (EP-A-045 851 and EP-A-106 235).

Phosphate-, chromate- and/or vanadate-containing and also phosphate- and $SiO_2$-containing metal oxide layers can be applied in accordance with the passivation methods described in DE-A-42 36 332, EP-A-678 561 and in EP-A-826 745 by means of hydrolytic or oxidative gaseous phase decomposition of oxide-halides of the metals (e.g. $CrO_2Cl_2$, $VOCl_3$), especially of phosphorus oxyhalides (e.g. $POCl_3$), phosphoric and phosphorous acid esters (e.g. di- and tri-methyl and di- and tri-ethyl phosphite) and of amino-group-containing organyl silicon compounds (e.g. 3-aminopropyl-triethoxy- and -trimethoxy-silane).

Layers of oxides of the metals zirconium, titanium, iron and zinc, oxide hydrates of those metals, iron titanates, titanium suboxides or mixtures thereof are preferably applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-14 67 468, DE-A-19 59 988, DE-A-20 09 566, DE-A-22 14 545, DE-A-22 15 191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 19599 88, WO 93/08237, WO 98/53001 and WO03/6558.

The metal oxide of high refractive index is preferably $TiO_2$ and/or iron oxide, and the metal oxide of low refractive index is preferably $SiO_2$. Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735,114, DE-A-3433657, DE-A-4125134, EP-A-332071, EP-A-707, 050 or WO93/19131.

For the purpose of coating, the substrate particles are suspended in water and one or more hydrolysable metal salts are added at a pH suitable for the hydrolysis, which is so selected that the metal oxides or metal oxide hydrates are precipitated directly onto the particles without subsidiary precipitation occurring. The pH is usually kept constant by simultaneously metering in a base. The pigments are then separated off, washed, dried and, where appropriate, calcinated, it being possible to optimise the calcinating temperature with respect to the coating in question. If desired, after individual coatings have been applied, the pigments can be separated off, dried and, where appropriate, calcinated, and then again re-suspended for the purpose of precipitating further layers.

The metal oxide layers are also obtainable, for example, in analogy to a method described in DE-A-195 01 307, by producing the metal oxide layer by controlled hydrolysis of one or more metal acid esters, where appropriate in the presence of an organic solvent and a basic catalyst, by means of a sol-gel process. Suitable basic catalysts are, for example, amines, such as triethylamine, ethylenediamine, tributylamine, dimethylethanolamine and methoxy-propylamine. The organic solvent is a water-miscible organic solvent such as a $C_{1-4}$alcohol, especially isopropanol.

Suitable metal acid esters are selected from alkyl and aryl alcoholates, carboxylates, and carboxyl-radical- or alkyl-radical- or aryl-radical-substituted alkyl alcoholates or carboxylates of vanadium, titanium, zirconium, silicon, aluminium and boron. The use of triisopropyl aluminate, tetraisopropyl titanate, tetraisopropyl zirconate, tetraethyl orthosilicate and triethyl borate is preferred. In addition, acetylacetonates and acetoacetylacetonates of the aforementioned metals may be used. Preferred examples of that type of metal acid ester are zirconium acetylacetonate, aluminium acetylacetonate, titanium acetylacetonate and diisobutyloleyl acetoacetylaluminate or diisopropyloleyl acetoacetylacetonate and mixtures of metal acid esters, for example Dynasil® (Hüls), a mixed aluminium/silicon metal acid ester.

As a metal oxide having a high refractive index, titanium dioxide is preferably used, the method described in U.S. Pat. No. 3,553,001 being used, in accordance with an embodiment of the present invention, for application of the titanium dioxide layers.

An aqueous titanium salt solution is slowly added to a suspension of the material being coated, which suspension has been heated to about 50-100° C., especially 70-80° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated $TiO_2$ has been achieved, the addition of titanium salt solution and base is stopped.

This method, also referred to as a titration method, is distinguished by the fact that an excess of titanium salt is avoided. That is achieved by feeding in for hydrolysis, per unit time, only that amount which is necessary for even coating with the hydrated $TiO_2$ and which can be taken up per unit time by the available surface of the particles being coated. In principle, the anatase form of $TiO_2$ forms on the surface of the starting pigment. By adding small amounts of $SnO_2$, however, it is possible to force the rutile structure to be formed.

The thickness of the $TiO_2$ layer is generally in the range of from 5 to 100 nm.

Where appropriate, an $SiO_2$ (protective) layer can be applied on top of the titanium dioxide layer, for which the following method may be used: A soda waterglass solution is metered in to a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the waterglass solution, stirring is carried out for 30 minutes.

The interference pigments are preferably obtained by suspending the $SiO_2$- or $SiO_y$-coated aluminum flakes in water and coating with a metal oxide hydrate having a high refractive index and, where appropriate, a metal oxide hydrate of low refractive index by addition and hydrolysis of corresponding, water-soluble metal compounds by means of conventional processes, the pH value required for precipitation of the metal oxide hydrate in question being established and kept constant by the simultaneous addition of acid or base, and subsequently separating the coated carrier material from the aqueous suspension, drying and, where appropriate, calcining (see, for example, DE 1959988, DE 2215191, DE2244298, DE2313331, DE2522572, DE 3137808, DE3137809, DE 3151343, DE3151355, DE3211602, DE3235017, WO93/08237 and WO98/53011).

Instead of a layer of a metal oxide having a high index of refraction U.S. Pat. No. 6,524,381 materials, such as diamond-like carbon and amorphous carbon, can be deposited by plasma-assisted vacuum methods (using vibrating conveyors, rotating drum coaters, oscillatory drum coaters, and free-fall chambers) as described, for example in U.S. Pat. No. 6,524,381, on the $SiO_z$-coated metal substrates.

Consequently, the present invention also relates to plane-parallel structures (pigments) based on silicon oxide/aluminum substrates having on their surface a carbon layer especially a diamond-like carbon layer having a thickness of 5 to 150 nm, especially 20 to 70 nm, more especially 30 to 70 nm.

In the method described, for example, in U.S. Pat. No. 6,015,597, diamond-like network (DLN) coatings are deposited onto particles from carbon-containing gases, such as, for example, acetylene, methane, butadiene and mixtures of these and optionally Ar, and optionally gases containing additional components by plasma deposition. Deposition occurs at reduced pressures (relative to atmospheric pressure) and in a controlled environment. A carbon rich plasma is created in a reaction chamber by applying an electric field to a carbon-containing gas. Particles to be coated are held in a vessel or container in the reactor and are agitated while in proximity to the plasma. Species within the plasma react on the particle surface to form covalent bonds, resulting in DLN on the surface of the particles.

The term "diamond-like network" (DLN) refers to amorphous films or coatings comprised of carbon and optionally comprising one or more additional components selected from the group consisting of hydrogen, nitrogen, oxygen, fluorine, silicon, sulfur, titanium, and copper. The diamond-like networks comprise approximately 30 to 100 atomic percent carbon, with optional additional components making up the remainder Coating of the $SiO_z$-coated flakes with a diamond-like carbon layer or a diamond-like network can be carried out, for example, by a process and an apparatus described in U.S. Pat. No. 6,241,858, or EP-A-1034320, comprising providing a capacitively coupled reactor system, comprising two electrodes in an evacuable reaction chamber, placing a multiplicity of particles in proximity to one of the electrodes; evacuating the chamber;

allowing high-frequency energy to act on the electrode that is in proximity to the particles and grounding the other electrode, introducing a carbon-containing source, for example hydrocarbon gases, such as acetylene, methane, butadiene or mixtures thereof, into the reaction chamber thereby forming a plasma comprising reactive species in proximity to the multiplicity of particles, and further forming an ion cloud around the grounded electrode, agitating the flakes in such a manner as to expose the surfaces thereof to the reactive species in the plasma while keeping the particles substantially within the ion cloud. The diamond-like network may consist of carbon and, where applicable, may comprise one or more components consisting of hydrogen, nitrogen, oxygen, fluorine, silicon, sulfur, titanium or copper.

The present invention therefore relates also to pigments based on the aluminum flakes according to the invention comprising on the layers (A1) and (A2) or on the layers (C1) and (C2), preferably over the entire surface of the aluminum flakes, a layer (E) consisting of a layer of a dielectric material having a "high" refractive index, especially $TiO_2$, or of carbon, preferably diamond-like carbon, and to pigments based on the aluminum flakes according to the invention comprising on the layers (D1) and (D2), preferably over the entire surface of the aluminum flakes, a layer (E) consisting of a dielectric material having a "high" refractive index, especially $TiO_2$, or of carbon, preferably diamond-like carbon.

The thickness of the carbon layer is generally from 5 to 150 nm, preferably from 30 to 70 nm.

Furthermore, the $SiO_z$-coated aluminum flakes may, as described in EP-A-0 982 376, be coated with a nitrogen-doped carbon layer. The process described in EP-A-0 982 376 comprises the following steps:
(a) suspending the silicon oxide-coated aluminum flakes in a liquid,
(b) where appropriate adding a surface-modifier and/or a polymerization catalyst,
(c), before or after step (b), adding one or more polymers comprising nitrogen and carbon atoms, or one or more monomers capable of forming such polymers,
(d) forming a polymeric coating on the surface of the flakes,
(e) isolating the coated flakes and
(f) heating the coated flakes to a temperature of from 100 to 600° C. in a gaseous atmosphere.

The polymer may be a polypyrrole, a polyamide, a polyaniline, a polyurethane, a nitrile rubber or a melamine-formaldehyde resin, preferably a polyacrylonitrile, or the monomer is a pyrrole derivative, an acrylonitrile, a methacrylonitrile, a crotonitrile, an acrylamide, a methacrylamide or a crotonamide, preferably an acrylonitrile, methacrylonitrile or crotonitrile, most preferably an acrylonitrile.

Preferably, the flakes are heated in step (f) initially to from 100° C. to 300° C. in an oxygen-containing atmosphere and then to from 200 to 600° C. in an inert gas atmosphere.

The present invention therefore relates also to pigments based on the aluminum flakes according to the invention comprising over the entire surface of the silicon oxide coated aluminum flakes a layer (F) consisting of from 50 to 95% by weight carbon, from 5 to 25% by weight nitrogen and from 0 to 25% by weight of the elements hydrogen, oxygen and/or sulfur, the percentage by weight data relating to the total weight of the layer (F).

The thickness of the nitrogen-doped carbon layer is generally from 10 to 150 nm, preferably from 30 to 70 nm.

Interference pigments on basis of the $SiO_z$ coated aluminum flake are available by the process of the present invention, or by coating the $SiO_z$ coated aluminum flakes obtained by the process of the present invention with further layers (see above). Such pigments have preferably the following layer structure: C/X/Al/X/C, Al/X/Al/X/Al, Cr (5-40 nm)/X (100-600 nm)/Al (50-100 nm)/X (100-600 nm)/Cr (5-40 nm), $MoS_2$/X/Al/X/$MoS_2$, $Fe_2O_3$/X/Al/X/$Fe_2O_3$, wherein X is $SiO_z$, wherein $0.70 \leq z \leq 2.0$, preferably $1.0 \leq z \leq 2.0$, most preferably $1.4 \leq z \leq 2.0$.

In another embodiment the present invention relates to a flaky (platelet-like) pigment which comprises a core of a metal, especially aluminum, coated with a silicon oxide (or alumina) film, the substrate being coated over its entire surface with a metal oxide, selected from titanium dioxide, zirconium oxide, iron oxide, tin oxide, zinc oxide and cerium oxide, and further coated with a semi-transparent thin metal film, which pigment exhibits a color flop effect.

If $SiO_z/Al/SiO_z$ flakes are used as "substrate", the $SiO_z$ layer is on the top and the bottom surface of the aluminum core, but not on the side surfaces thereof. If layers of silica or alumina are applied by a sol-gel process, the entire surface of the aluminum flake is coated with protective layers of silica or alumina. The sol-gel method comprises forming a sol through hydrolysis and poly-condensation of a solution of an organic metal compound or the like, followed by gelling it. Next, the resulting gel is heated to form a metal oxide. The organic metal compound includes silicon methoxides, ethoxides, propoxides, etc., such as tetramethoxysilane, tetraethoxysilane, tetraisopropoxysilane, methyl-triethoxysilane, dimethyl-dimethoxysilane, etc., and aluminum methoxides, ethoxides, propoxides, etc., for example, trimethoxyaluminate, triethoxyaluminate, tripropoxy-aluminate, etc. The amount of protective film my fall between 0.1 to 10% by weight of the metal (core) coated with it.

Preferably, the entire surface of the flaky substrate is coated with the metal oxide and the entire surface of the metal oxide-coated flaky pigment is coated with the semi-transparent thin metal film. The sol-gel method is also preferred for applying the metal oxide coating. For example, when a titanium dioxide film is formed, the organic metal compound to be used may be titanium tetraalkoxides such as titanium tetramethoxide, titanium tetraethoxide, titanium tetrabutoxide, etc. For forming a zirconium oxide film, usable are zirconium tetraalkoxides such as zirconium tetraethoxide, zirconium tetrapropoxide, zirconium tetrabutoxide, etc. For forming a cerium oxide film, usable are cerium tetraalkoxides such as cerium tetramethoxide, cerium tetrapropoxide, etc. For forming a tin oxide film, usable are tin octylate, dibutyl-tin dilaurate, dioctyl-tin oxide, etc.

The semi-transparent thin metal film has a thickness of less than 50 nm. The semi-transparent thin metal film is formed of one or more metals selected from Ni, Zn, Cr. Co, Cu. Pt. Ag, Au, and alloys thereof. Examples of an alloy are Ni—Co, Ni—Fe, or Co—Fe. The thickness of the metal oxide coating is from 90 to 360 nm. The semi-transparent thin metal film is preferably apllied by a chemical plating method not requiring pretreatment for activation (Shikizai Kvokai-shi ("Journal of the Japan Society of Color Material"), 69 (6), 370-377 (1996)). In this, an acetylacetonato-metal complex is reduced in an organic solvent to thereby plate a substrate with the metal derived from the complex. For example, in the case of forming a nickel film on the metal oxide-coated flaky pigment substrate according to this plating method, using bis(acetylacetonato)nickel(II) and hydrazine as a reducing agent in a polar aprotic solvent, dimethylsulfoxide (DMSO), a dense nickel film may be formed on the substrate. In said aspect of the present invention $Ni/SiO_z$, $Ni/TiO_2/SiO_z$ or $Ni/TiO_2/SiO_2$ aluminum flakes are preferred.

In another preferred embodiment the present invention relates to the production of diffractive pigment flakes. The diffractive pigment flakes include single layer or multiple layer flakes that have a diffractive structure formed on a surface thereof. The multiple layer flakes can have a symmetrical stacked coating structure on opposing sides of a reflective core layer, or can be formed with encapsulating coatings around the reflective core layer. The diffractive pigment flakes can be formed with a variety of diffractive structures thereon to produce selected optical effects. In particular, the diffractive pigment flakes are fabricated to have specific diffractive surface microstructures along with physical and micro-mechanical attributes that provide enhanced optical effects. The diffractive structure on the flakes can be an optical interference pattern such as a diffractive grating or holographic image pattern. Depending on the desired optical effects, suitable grated microstructures are selected for the production of flakes with the optimal diffractive effects. Such optical effects are created by the right combination of diffractive and reflective optics to produce, for example, strong, eye-catching optical effects that change and flash as the viewer changes position. For example, the pigment flakes can include a higher frequency diffractive grating microstructure such as a diffraction grating pattern having greater than about 1100 grating lines per mm (In/mm) to create a wide range of optical effects. That is, the diffractive effects are only perceptible outside the visible wavelength range, such as in the ultraviolet (UV) or infrared (IR) wavelength ranges. This covert feature is produced by using gratings which only preferentially create diffractive effects in the UV or IR wavelength range. For example, at normal incidence, flakes with a grating frequency above about 2500 In/mm produce diffractive effects that are only perceptible in the wavelength range of about 100 nm to about 400 nm. Thus, a conventional UV detection apparatus can be configured to quickly and accurately detect the presence of such diffractive flakes, while the unaided human eye is unable to detect the presence of the diffractive structures.

The diffractive flakes can be formed to have a physical thickness of about 500 nm to about 2 microns (2,000 nm), preferably about 800 nm to about 1400 nm (1.4 microns). The line frequency of the diffractive structure on the flakes is preferably greater than about 1,200 In/mm, such that light corresponding to the range of visible wavelengths in the first or higher order diffracted beams is substantially angularly separated from the same range of wavelengths in higher order diffracted beams when illuminated at normal incidence up to at least about 60 degrees from normal incidence. The diffractive structure can be a linear blazed (i.e., sawtooth shape) grating having a frequency of at least about 1,400 In/mm and a groove depth greater than about 160 nm, or a linear sinusoidal grating having a frequency of at least about 2,000 In/mm and a groove depth greater than about 160 nm.

In one preferred embodiment of the diffractive flakes, a transparent dielectric material, such as magnesium fluoride ($MgF_2$), or $SiO_z$, can be deposited as a first layer and third layer to form stiffening protective layers over a second (inner) opaque aluminum layer. The $MgF_2$, or $SiO_z$ layers are preferably each about 250 nm to about 450 nm thick, and the aluminum layer is preferably about 80 nm to about 160 nm thick. The diffractive flakes have a total thickness of less than about 1,400 nm, and preferably from about 500 nm to about 900 nm.

The diffractive structure is formed on at least a portion of one or both of the major surfaces of the flakes. The diffractive structure on the flakes can be a diffraction grating pattern with at least about 1,400 grating In/mm and a grating depth of at least about 150 nm. Preferably, the diffraction grating pattern can have from about 1400 to about 3500 grating In/mm, with a grating depth from about 150 nm to about 230 nm, and more preferably, the diffraction grating pattern can have from about 1400 to about 1700 grating In/mm, and a grating depth from about 160 nm to about 220 nm.

When the diffractive flakes consist of a single layer, a reflective material can be used to form said layer. Presently preferred reflective materials include various metals or metal alloys because of their high reflectivity and ease of use, although non-metallic reflective materials can also be used. Nonlimiting examples of suitable metallic materials include aluminum, silver, copper, gold, platinum, tin, titanium, palladium, nickel, cobalt, rhodium, niobium, chromium, and compounds, combinations or alloys thereof. The flakes consisting of a single layer can have a physical thickness of from about 500 nm to about 1400 nm, preferably from about 700 nm to about 1200 nm.

The diffractive flakes can have a three layer design with a generally symmetrical thin film structure, including a central reflector layer and opposing dielectric layers and on opposing major surfaces of reflector layer but not on at least one side surface of the reflector layer. The reflector layer can be composed of the same reflective materials as discussed previously for the single layer flakes. The dielectric layers can be composed of various dielectric materials such as those having a refractive index of about 1.65 or less, and preferably a refractive index of about 1.5 or less. Nonlimiting examples of suitable dielectric materials include magnesium fluoride, $SiO_z$, silicon dioxide, aluminum oxide, aluminum fluoride, cerium fluoride, lanthanum fluoride, neodymium fluoride, samarium fluoride, barium fluoride, calcium fluoride, lithium fluoride, and combinations thereof. The reflector layer can have a physical thickness of from about 40 nm to about 200 nm, and preferably from about 80 nm to about 160 nm. The dielectric layers can each have a physical thickness of about 1 micron or less, preferably from about 200 nm to about 600 nm, and more preferably from about 250 nm to about 450 nm.

In a method for fabricating the diffractive flakes, the separating agent layer, the reflector layer and optionally dielectric layers are deposited on a (movable) carrier having a diffractive grating on its surface in a sequential manner according to the desired flake design. The diffractive flakes are separated from the carrier by dissolving the separating agent in a suitable solvent. The carrier can be an embossed metal carrier, such as a metal belt, a rotating disk or cylinder. The diffractive grating can be produced by etching. Instead of metal a heat-resistant plastic, such as Capton® can be used.

The invention also relates to the use of the pigments based on the aluminum flakes according to the invention in paints, textiles (see, for example, WO04/035911), ink-jet printing (see, for example, WO04/035684), cosmetics (see, for example, WO04/020530), printing inks, plastics materials, coatings, especially in automotive finishes, in glazes for ceramics and glass, and in security printing.

If the layers present on the aluminum core are applied by PVD, those layers will be present only on the parallel faces of the core and not, however, on the side faces. If (further) layers are applied by wet-chemical precipitation, they will cover the entire surface of the flakes.

Metallic or non-metallic, inorganic platelet-shaped particles or pigments are effect pigments, (especially metal effect pigments or interference pigments), that is to say, pigments that, besides imparting color to an application medium, impart additional properties, for example angle dependency of the color (flop), lustre (not surface gloss) or texture. On metal effect pigments (aluminum flakes), substantially oriented reflection occurs at directionally oriented pigment particles. In the case of interference pigments (pigments), the color-imparting effect is due to the phenomenon of interference of light in thin, highly refractive layers.

The pigments according to the invention can be used for all customary purposes, for example for coloring polymers in the mass, coatings (including effect finishes, including those for the automotive sector) and printing inks (including offset printing, intaglio printing, bronzing and flexographic printing), and also, for example, for applications in cosmetics, in ink-jet printing, for dyeing textiles, glazes for ceramics and glass as well as laser marking of papers and plastics. Such applications are known from reference works, for example "Industrielle Organische Pigmente" (W. Herbst and K. Hunger, VCH Verlagsgesellschaft mbH, Weinheim/New York, 2nd, completely revised edition, 1995).

When the pigments according to the invention are interference pigments (effect pigments), they are goniochromatic and result in brilliant, highly saturated (lustrous) colors. They are accordingly very especially suitable for combination with conventional, transparent pigments, for example organic pigments such as, for example, diketopyrrolopyrroles, quinacridones, dioxazines, perylenes, isoindolinones etc., it being possible for the transparent pigment to have a similar color to the effect pigment. Especially interesting combination effects are obtained, however, in analogy to, for example, EP-A-388 932 or EP-A-402 943, when the color of the transparent pigment and that of the effect pigment are complementary.

The pigments according to the invention can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as film-formers or binders for coatings or printing inks, such as, for example, boiled linseed oil, nitrocellulose, alkyd resins, melamine resins and urea-formaldehyde resins or acrylic resins.

Depending on the intended purpose, it has proved advantageous to use the (effect) pigments or (effect) pigment compositions according to the invention as toners or in the form of preparations. Depending on the conditioning method or intended application, it may be advantageous to add certain amounts of texture-improving agents to the effect pigment before or after the conditioning process, provided that this has no adverse effect on use of the effect pigments for coloring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The (effect) pigments according to the invention can be added in any tinctorially effective amount to the high molecular weight organic material being pigmented. A pigmented composition comprising a high molecular weight organic material and from 0.01 to 80% by weight, preferably from 0.1 to 30% by weight, based on the high molecular weight organic material, of an pigment according to the invention is advantageous. Concentrations of from 1 to 20% by weight, especially of about 10% by weight, can often be used in practice.

High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

For the purpose of pigmenting organic materials, the effect pigments according to the invention may be used singly. It is, however, also possible, in order to achieve different hues or color effects, to add any desired amounts of other color-imparting constituents, such as white, colored, black or effect pigments, to the high molecular weight organic substances in addition to the effect pigments according to the invention. When colored pigments are used in admixture with the effect pigments according to the invention, the total amount is preferably from 0.1 to 10% by weight, based on the high molecular weight organic material. Especially high goniochromicity is provided by the preferred combination of an effect pigment according to the invention with a colored pigment of another color, especially of a complementary color, with colorations made using the effect pigment and colorations made using the colored pigment having, at a measurement angle of 10°, a difference in hue ($\Delta H^*$) of from 20 to 340, especially from 150 to 210.

Preferably, the effect pigments according to the invention are combined with transparent colored pigments, it being possible for the transparent colored pigments to be present either in the same medium as the effect pigments according to the invention or in a neighbouring medium. An example of an arrangement in which the effect pigment and the colored pigment are advantageously present in neighbouring media is a multi-layer effect coating.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmenting coatings and printing inks, the high molecular weight organic materials and the effect pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing an effect pigment according to the invention in the high molecular weight organic material being pigmented, and processing a pigment composition according to the invention, are preferably carried out subject to conditions under which only relatively weak shear forces occur so that the effect pigment is not broken up into smaller portions.

Plastics comprise the pigment of the invention in amounts of 0.1 to 50% by weight, in particular 0.5 to 7% by weight. In the coating sector, the pigments of the invention are employed in amounts of 0.1 to 10% by weight. In the pigmentation of binder systems, for example for paints and printing inks for intaglio, offset or screen printing, the pigment is incorporated into the printing ink in amounts of 0.1 to 50% by weight, preferably 5 to 30% by weight and in particular 8 to 15% by weight.

The colorations obtained, for example in plastics, coatings or printing inks, especially in coatings or printing inks, more especially in coatings, are distinguished by excellent properties, especially by extremely high saturation, outstanding fastness properties and high goniochromicity.

When the high molecular weight material being pigmented is a coating, it is especially a speciality coating, very especially an automotive finish.

The effect pigments according to the invention are also suitable for making-up the lips or the skin and for coloring the hair or the nails.

The invention accordingly relates also to a cosmetic preparation or formulation comprising from 0.0001 to 90% by weight of a pigment, especially an effect pigment, according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations. The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eye-liners, powder or nail varnishes.

If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecane-oxypolysiloxane and poly(dimethylsiloxy)-stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminum.

The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410° C., silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in the form of sticks may generally constitute up to 99.91% by weight of the total weight of the preparation.

The cosmetic preparations and formulations according to the invention may additionally comprise further constituents, such as, for example, glycols, polyethylene glycols, polypropylene glycols, monoalkanolamides, non-coloured polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sun-protection filters, or a mixture of such substances.

A lipophilic functional cosmetic active ingredient suitable for skin cosmetics, an active ingredient composition or an active ingredient extract is an ingredient or a mixture of ingredients that is approved for dermal or topical application. The following may be mentioned by way of example:

active ingredients having a cleansing action on the skin surface and the hair; these include all substances that serve to cleanse the skin, such as oils, soaps, synthetic detergents and solid substances;

active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example ®Grillocin (combination of zinc ricinoleate and various additives) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers); suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenyl-benzimidazolesulfonic acid and salts thereof, menthyl anthranilates, benzotriazole derivatives, and/or an inorganic micropigment selected from aluminium oxide- or silicon dioxide-coated $TiO_2$, zinc oxide or mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U. Kindl, Gustav-Fischer-Verlag Stuttgart/New York, 1991) on page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin;

moisturising substances: the following substances, for example, are used as moisture-controlling agents (moisturisers): sodium lactate, urea, alcohols, sorbitol, glycerol, propylene glycol, collagen, elastin and hyaluronic acid;

active ingredients having a keratoplastic effect: benzoyl peroxide, retinoic acid, colloidal sulfur and resorcinol;

antimicrobial agents, such as, for example, triclosan or quaternary ammonium compounds;

oily or oil-soluble vitamins or vitamin derivatives that can be applied dermally: for example vitamin A (retinol in the form of the free acid or derivatives thereof), panthenol, pantothenic acid, folic acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_1$, $B_2$, $B_6$, $B_{12}$, folic acid and biotin, amino acids and enzymes as well as compounds of the trace elements magnesium, silicon, phosphorus, calcium, manganese, iron or copper;

skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation.

If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes.

If, on the other hand, such ointments or creams are aqueous, they are especially emulsions of the water-in-oil type or of the oil-in-water type that comprise, apart from the pigment, from 1 to 98.8% by weight of the fatty phase, from 1 to 98.8% by weight of the aqueous phase and from 0.2 to 30% by weight of an emulsifier.

Such ointments and creams may also comprise further conventional additives, such as, for example, perfumes, antioxidants, preservatives, gel-forming agents, UV filters, colorants, pigments, pearlescent agents, non-coloured polymers as well as inorganic or organic fillers. If the preparations are in the form of a powder, they consist substantially of a mineral or inorganic or organic filler such as, for example, talcum, kaolin, starch, polyethylene powder or polyamide powder, as well as adjuvants such as binders, colorants etc.

Such preparations may likewise comprise various adjuvants conventionally employed in cosmetics, such as fragrances, antioxidants, preservatives etc.

If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents.

In that embodiment, the coloured polymer is present in an amount of approximately from 0.1 to 5% by weight.

The cosmetic preparations and formulations according to the invention may also be used for colouring the hair, in which case they are used in the form of shampoos, creams or gels that are composed of the base substances conventionally employed in the cosmetics industry and a pigment according to the invention.

The cosmetic preparations and formulations according to the invention are prepared in conventional manner, for example by mixing or stirring the components together, optionally with heating so that the mixtures melt.

In a further preferred embodiment the process of the present invention is used to produce $SiO_z$ flakes, which are produced from $SiO_y$ flakes.

The $SiO_y$ flakes are preferably prepared by a process comprising the steps (WO03/68868):
a) vapour-deposition of a separating agent onto a (movable) carrier to produce a separating agent layer,
b) vapour-deposition of an $SiO_y$ layer onto the separating agent layer, wherein $0.70 \leq y \leq 1.8$,
c) dissolution of the separating agent layer in a solvent, and
d) separation of the $SiO_y$ from the solvent.

$SiO_y$ with $y>1.0$ can be obtained by evaporation of SiO in the presence of oxygen. Layers, which are essentially free of absorption, can be obtained, if the growing $SiO_y$ layer is irradiated with UV light during evaporation (DE-A-1621214). It is possible to obtain $SiO_{1.5}$ layers, which do not absorb in the visible region and have a refractive index of 1.55 at 550 nm, by so-called "reactive evaporation" of SiO in a pure oxygen atmosphere (E. Ritter, J. Vac. Sci. Technol. 3 (1966) 225).

The $SiO_y$ flakes may be oxidised using an oxygen-containing gas such as, for example, air at a temperature of at least 200° C., especially at above 400° C., preferably in the form of loose material, in a fluidised bed or by introduction into an oxidising flame, preferably at a temperature in the range from 500 to 1000° C., to form plane-parallel structures of $SiO_z$ (WO03/068868).

The $SiO_z$ flakes can be, for example, further processed to interference pigments by applying further layers.

Such pigments, the particles of which generally have a length of from 2 μm to 5 mm, a width of from 2 μm to 2 mm, and a thickness of from 20 nm to 2 μm, and a ratio of length to thickness of at least 2:1, wherein the particles contain a core of $SiO_z$ with $0.70 \leq z \leq 2.0$, especially $1.1 \leq z \leq 2.0$, most preferred $1.4 \leq z \leq 2.0$, having two substantially parallel faces, the distance between which is the shortest axis of the core (thickness), comprise (a) a material, especially a metal oxide, having a high index of refraction, or the pigments comprise (a) a (thin semi-transparent) metal layer.

Suitable metals for the semi-transparent metal layer are, for example, Cr. Ti, Mo, W. Al, Cu, Ag, Au, or Ni. The semi-transparent metal layer has typically a thickness of between 5 and 25 nm, especially between 5 and 15 nm. The $SiO_z$ substrates can have a metal layer only on one parallel surface, but preferably the metal layer is present on both parallel faces of the substrate.

The metal/$SiO_z$/metal flakes are prepared by a PVD process comprising the steps:
a) vapour-deposition of a separating agent onto a carrier to produce a separating agent layer,
b1) vapour-deposition of a metal layer onto the separating agent layer,
b2) vapour-deposition of an $SiO_y$ layer onto the metal layer, wherein $0.70 \leq y \leq 1.80$,
b3) vapour-deposition of a metal layer onto the $SiO_y$ layer,
c) dissolution of the separating agent layer in a solvent, and
d) separation of the metal/$SiO_z$/metal flakes from the solvent.

Alternatively the metal layer can be obtained by wet chemical coating or by chemical vapor deposition, for example, gas phase deposition of metal carbonyls. The substrate is suspended in an aqueous and/or organic solvent containing medium in the presence of a metal compound and is deposited onto the substrate by addition of a reducing agent. The metal compound is, for example, silver nitrate or nickel acetyl acetonate (WO03/37993).

According to U.S. Pat. No. 3,536,520 nickel chloride can be used as metal compound and hypophosphite can be used as reducing agent. According to EP-A-353544 the following compounds can be used as reducing agents for the wet chemical coating: aldehydes (formaldehyde, acetaldehyde, benzaldehyde), ketones (acetone), carbonic acids and salts thereof (tartaric acid, ascorbinic acid), reductones (isoascorbinic acid, trioseductone, reductine acid), and reducing sugars (glucose).

If semi-transparent metal layers are desired, the thickness of the metal layer is generally between 5 and 25 nm, especially between 5 and 15 nm.

If pigments with metallic appearance are desired, the thickness of the metal layer is >25 nm to 100 nm, preferably 30 to 50 nm. If pigments with colored metal effects are desired, additional layers of colored or colorless metal oxides, metal nitrides, metal sulfides and/or metals can be deposited. These layers are transparent or semi-transparent. It is preferred that layers of high index of refraction and layers of low index of refraction alternate or that one layer is present, wherein within the layer the index of refraction is gradually changing. It is possible for the weathering resistance to be increased by means of an additional coating, which at the same time causes an optimal adaption to the binder system (EP-A-268918 and EP-A-632109).

In one preferred embodiment of the present invention, the interference pigments comprise materials having a "high" index of refraction, which is defined herein as an index of refraction of greater than about 1.65, and optionally materials having a "low" index of refraction, which is defined herein as an index of refraction of about 1.65 or less. Various (dielectric) materials that can be utilized including inorganic materials such as metal oxides, metal suboxides, metal fluorides, metal oxyhalides, metal sulfides, metal chalcogenides, metal nitrides, metal oxynitrides, metal carbides, combinations thereof, and the like, as well as organic dielectric materials. These materials are readily available and easily applied by physical, or chemical vapor deposition processes, or by wet chemical coating processes.

In an especially preferred embodiment, the interference pigments on the basis of the silicon oxide substrate comprises a further layer of a dielectric material having a "high" refractive index, that is to say a refractive index greater than about 1.65, preferably greater than about 2.0, most preferred greater than about 2.2, which is applied to the entire surface of the silicon/silicon oxide substrate. Examples of such a dielectric material are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$) or combinations thereof. The dielectric material is preferably a metal oxide. It being possible for the metal oxide to be a single oxide or a mixture of oxides, with or without absorbing properties, for example, $TiO_2$, $ZrO_2$, $Fe_2O_3$, $Fe_3O_4$, $Cr_2O_3$, $CeO_2$, or ZnO, with $TiO_2$ being especially preferred.

It is possible to obtain pigments that are more intense in colour and more transparent by applying, on top of the $TiO_2$ layer, a metal oxide of low refractive index, such as $SiO_2$, $Al_2O_3$, AlOOH, $B_2O_3$ or a mixture thereof, preferably $SiO_2$, and optionally applying a further $TiO_2$ layer on top of the latter layer (EP-A-892832, EP-A-753545, WO93/08237, WO98/53011, WO9812266, WO9838254, WO99/20695, WO00/42111, and EP-A-1213330). Nonlimiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3\mu l_4$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, the disclosure of which is incorporated herein by reference.

Accordingly, preferred interference pigments comprise besides (a) a metal oxide of high refractive index in addition and (b) a metal oxide of low refractive index, wherein the difference of the refractive indices is at least 0.1.

Pigments on the basis of silicon oxide ($SiO_z$) substrates, which have been coated by a wet chemical method, in the indicated order are particularly preferred:

$TiO_2$ (substrate: silicon oxide; layer: $TiO_2$, preferably in the rutile modification), $(SnO_2)TiO_2$, $Fe_2O_3$, $Fe_3O_4$, $TiFe_2O_5$, $Cr_2O_3$, $ZrO_2$, $Sn(Sb)O_2$, BiOCl, $Al_2O_3$, $Ce_2S_3$, $MoS_2$, $Fe_2O_3 \cdot TiO_2$ (substrate: silicon oxide; mixed layer of $Fe_2O_3$ and $TiO_2$), $TiO_2/Fe_2O_3$ (substrate: silicon oxide; first layer: $TiO_2$; second layer: $Fe_2O_3$), $TiO_2$/Berlin blau, $TiO_2/Cr_2O_3$, or $TiO_2/FeTiO_3$. In general the layer thickness ranges from 1 to 1000 nm, preferably from 1 to 300 nm.

In another particularly preferred embodiment the present invention relates to interference pigments containing at least three alternating layers of high and low refractive index, such as, for example, $TiO_2/SiO_2/TiO_2$, $(SnO_2)TiO_2/SiO_2/TiO_2$, $TiO_2/SiO_2/TiO_2/SiO_2/TiO_2$ or $TiO_2/SiO_2/Fe_2O_3$: Preferably the layer structure is as follows:

(A) a coating having a refractive index >1.65,
(B) a coating having a refractive index ≦1.65,
(C) a coating having a refractive index >1.65, and
(D) optionally an outer protective layer.

The thickness of the individual layers of high and low refractive index on the base substrate is essential for the optical properties of the pigment. The thickness of the individual layers, especially metal oxide layers, depends on the field of use and is generally 10 to 1000 nm, preferably 15 to 800 nm, in particular 20 to 600 nm.

The thickness of layer (A) is 10 to 550 nm, preferably 15 to 400 nm and, in particular, 20 to 350 nm. The thickness of layer (B) is 10 to 1000 nm, preferably 20 to 800 nm and, in particular, 30 to 600 nm. The thickness of layer (C) is 10 to 550 nm, preferably 15 to 400 nm and, in particular, 20 to 350 nm.

Particularly suitable materials for layer (A) are metal oxides, metal sulfides, or metal oxide mixtures, such as $TiO_2$, $Fe_2O_3$, $TiFe_2O_5$, $Fe_3O_4$, BiOCl, CoO, $Co_3O_4$, $Cr_2O_3$, $VO_2$, $V_2O_3$, $Sn(Sb)O_2$, $SnO_2$, $ZrO_2$, iron titanates, iron oxide hydrates, titanium suboxides (reduced titanium species having oxidation states from 2 to <4), bismuth vanadate, cobalt aluminate, and also mixtures or mixed phases of these compounds with one another or with other metal oxides. Metal sulfide coatings are preferably selected from sulfides of tin, silver, lanthanum, rare earth metals, preferably cerium, chromium, molybdenum, tungsten, iron, cobalt and/or nickel.

Particularly suitable materials for layer (B) are metal oxides or the corresponding oxide hydrates, such as $SiO_2$, $MgF_2$, $Al_2O_3$, AlOOH, $B_2O_3$ or a mixture thereof, preferably $SiO_2$.

Particularly suitable materials for layer (C) are colorless or colored metal oxides, such as $TiO_2$, $Fe_2O_3$, $TiFe_2O_5$, $Fe_3O_4$, BiOCl, CoO, $CO_3O_4$, $Cr_2O_3$, $VO_2$, $V_2O_3$, $Sn(Sb)O_2$, $SnO_2$, $ZrO_2$, iron titanates, iron oxide hydrates, titanium suboxides (reduced titanium species having oxidation states from 2 to <4), bismuth vanadate, cobalt aluminate, and also mixtures or mixed phases of these compounds with one another or with other metal oxides. The $TiO_2$ layers can additionally contain an absorbing material, such as carbon, selectively absorbing colorants, selectively absorbing metal cations, can be coated with absorbing material, or can be partially reduced.

Interlayers of absorbing or nonabsorbing materials can be present between layers (A), (B), (C) and (D). The thickness of the interlayers is 1 to 50 nm, preferably 1 to 40 nm and, in particular, 1 to 30 nm.

In this embodiment preferred interference pigments have the following layer structure:

| Core | Layer (A) | Layer (B) | Layer (C) |
|---|---|---|---|
| $SiO_z$ | $TiO_2$ | $SiO_2$ | $TiO_2$ |
| $SiO_z$ | $TiO_2$ | $SiO_2$ | $Fe_2O_3$ |
| $SiO_z$ | $TiO_2$ | $SiO_2$ | $TiO_2/Fe_2O_3$ |
| $SiO_z$ | $TiO_2$ | $SiO_2$ | $(Sn, Sb)O_2$ |
| $SiO_z$ | $(Sn, Sb)O_2$ | $SiO_2$ | $TiO_2$ |
| $SiO_z$ | $Fe_2O_3$ | $SiO_2$ | $(Sn, Sb)O_2$ |
| $SiO_z$ | $TiO_2/Fe_2O_3$ | $SiO_2$ | $TiO_2/Fe_2O_3$ |
| $SiO_z$ | $TiO_2$ | $SiO_2$ | $MoS_2$ |
| $SiO_z$ | $TiO_2$ | $SiO_2$ | $Cr_2O_3$ |
| $SiO_z$ | $Cr_2O_3$ | $SiO_2$ | $TiO_2$ |
| $SiO_z$ | $Fe_2O_3$ | $SiO_2$ | $TiO_2$ |
| $SiO_z$ | $TiO_2$ | $Al_2O_3$ | $TiO_2$ |
| $SiO_z$ | $Fe_2TiO_5$ | $SiO_2$ | $TiO_2$ |
| $SiO_z$ | $TiO_2$ | $SiO_2$ | $Fe_2TiO_5/TiO_2$ |
| $SiO_z$ | TiO suboxides | $SiO_2$ | TiO suboxides |
| $SiO_z$ | $TiO_2$ | $SiO_2$ | $TiO_2 + SiO_2 + TiO_2$ + Prussian Blue |
| $SiO_z$ | $TiO_2$ | $SiO_2$ | $TiO_2 + SiO_2 + TiO_2$ |
| $SiO_z$ | $TiO_2 + SiO_2 + TiO_2$ | $SiO_2$ | $TiO_2 + SiO_2 + TiO_2$ |

The pigments of the present invention are characterized by the precisely defined thickness and smooth surface of the thin $SiO_z$ flakes.

The metal oxide layers can be applied by CVD (chemical vapour deposition) or by wet chemical coating. The metal oxide layers can be obtained by decomposition of metal carbonyls in the presence of water vapour (relatively low molecular weight metal oxides such as magnetite) or in the presence of oxygen and, where appropriate, water vapour (e.g. nickel oxide and cobalt oxide). The metal oxide layers are especially applied by means of oxidative gaseous phase decomposition of metal carbonyls (e.g. iron pentacarbonyl, chromium hexacarbonyl; EP-A-45 851), by means of hydrolytic gaseous phase decomposition of metal alcoholates (e.g. titanium and zirconium tetra-n- and -iso-propanolate; DE-A-41 40 900) or of metal halides (e.g. titanium tetrachloride; EP-A-338 428), by means of oxidative decomposition of organyl tin compounds (especially alkyl tin compounds such as tetrabutyltin and tetramethyltin; DE-A-44 03 678) or by means of the gaseous phase hydrolysis of organyl silicon compounds (especially di-tert-butoxyacetoxysilane) described in EP-A-668 329, it being possible for the coating operation to be carried out in a fluidised-bed reactor (EP-A-045 851 and EP-A-106 235). $Al_2O_3$ layers (B) can advantageously be obtained by controlled oxidation during the cooling of aluminium-coated pigments, which is otherwise carried out under inert gas (DE-A-195 16 181).

Phosphate-, chromate- and/or vanadate-containing and also phosphate- and $SiO_2$-containing metal oxide layers can be applied in accordance with the passivation methods described in DE-A-42 36 332 and in EP-A-678 561 by means of hydrolytic or oxidative gaseous phase decomposition of oxide-halides of the metals (e.g. $CrO_2Cl_2$, $VOCl_3$), especially of phosphorus oxyhalides (e.g. $POCl_3$), phosphoric and phosphorous acid esters (e.g. di- and tri-methyl and di- and tri-ethyl phosphite) and of amino-group-containing organyl silicon compounds (e.g. 3-aminopropyl-triethoxy- and -trimethoxy-silane).

Layers of oxides of the metals zirconium, titanium, iron and zinc, oxide hydrates of those metals, iron titanates, titanium suboxides or mixtures thereof are preferably applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-14 67 468, DE-A-19 59 988, DE-A-20 09 566, DE-A-22 14 545, DE-A-22 15 191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, WO 93/08237, WO 98/53001 and WO03/6558.

The metal oxide of high refractive index is preferably $TiO_2$ and/or iron oxide, and the metal oxide of low refractive index is preferably $SiO_2$. Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735,114, DE-A-3433657, DE-A-4125134, EP-A-332071, EP-A-707, 050 or WO93/19131.

For the purpose of coating, the substrate particles are suspended in water and one or more hydrolysable metal salts are added at a pH suitable for the hydrolysis, which is so selected that the metal oxides or metal oxide hydrates are precipitated directly onto the particles without subsidiary precipitation occurring. The pH is usually kept constant by simultaneously metering in a base. The pigments are then separated off, washed, dried and, where appropriate, calcinated, it being possible to optimise the calcinating temperature with respect to the coating in question. If desired, after individual coatings have been applied, the pigments can be separated off, dried and, where appropriate, calcinated, and then again re-suspended for the purpose of precipitating further layers.

The metal oxide layers are also obtainable, for example, in analogy to a method described in DE-A-195 01 307, by producing the metal oxide layer by controlled hydrolysis of one or more metal acid esters, where appropriate in the presence of an organic solvent and a basic catalyst, by means of a sol-gel process. Suitable basic catalysts are, for example, amines, such as triethylamine, ethylenediamine, tributylamine, dimethylethanolamine and methoxy-propylamine. The organic solvent is a water-miscible organic solvent such as a $C_{1-4}$alcohol, especially isopropanol.

Suitable metal acid esters are selected from alkyl and aryl alcoholates, carboxylates, and carboxyl-radical- or alkyl-radical- or aryl-radical-substituted alkyl alcoholates or carboxylates of vanadium, titanium, zirconium, silicon, aluminium and boron. The use of triisopropyl aluminate, tetraisopropyl titanate, tetraisopropyl zirconate, tetraethyl orthosilicate and triethyl borate is preferred. In addition, acetylacetonates and acetoacetylacetonates of the aforementioned metals may be used. Preferred examples of that type of metal acid ester are zirconium acetylacetonate, aluminium acetylacetonate, titanium acetylacetonate and diisobutyloleyl acetoacetylaluminate or diisopropyloleyl acetoacetylacetonate and mixtures of metal acid esters, for example Dynasil® (Hüls), a mixed aluminium/silicon metal acid ester.

As a metal oxide having a high refractive index, titanium dioxide is preferably used, the method described in U.S. Pat. No. 3,553,001 being used, in accordance with an embodiment of the present invention, for application of the titanium dioxide layers.

An aqueous titanium salt solution is slowly added to a suspension of the material being coated, which suspension has been heated to about 50-100° C., especially 70-80° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated $TiO_2$ has been achieved, the addition of titanium salt solution and base is stopped.

This method, also referred to as the "titration method", is distinguished by the fact that an excess of titanium salt is avoided. That is achieved by feeding in for hydrolysis, per unit time, only that amount which is necessary for even coating with the hydrated $TiO_2$ and which can be taken up per unit time by the available surface of the particles being coated. In principle, the anatase form of $TiO_2$ forms on the surface of the starting pigment. By adding small amounts of $SnO_2$, however, it is possible to force the rutile structure to be formed. For example, as described in WO 93/08237, tin dioxide can be deposited before titanium dioxide precipitation and the product coated with titanium dioxide can be calcined at from 800 to 900° C.

The $TiO_2$ can optionally be reduced by usual procedures: U.S. Pat. No. 4,948,631 ($NH_3$, 750-850° C.), WO93/19131 ($H_2$, >900° C.) or DE-A-19843014 (solid reduction agent, such as, for example, silicon, >600° C.).

Where appropriate, an $SiO_2$ (protective) layer can be applied on top of the titanium dioxide layer, for which the following method may be used: A soda waterglass solution is metered in to a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the waterglass solution, stirring is carried out for 30 minutes.

It is possible to obtain pigments that are more intense in colour and more transparent by applying, on top of the $TiO_2$ layer, a metal oxide of "low" refractive index, that is to say a refractive index smaller than about 1.65, such as $SiO_2$, $Al_2O_3$, AlOOH, $B_2O_3$ or a mixture thereof, preferably $SiO_2$, and applying a further $Fe_2O_3$ and/or $TiO_2$ layer on top of the latter layer. Such multi-coated interference pigments comprising a silicon oxide substrate and alternating metal oxide layers of with high and low refractive index can be prepared in analogy to the processes described in WO98/53011 and WO99/20695.

It is, in addition, possible to modify the powder colour of the pigment by applying further layers such as, for example, coloured metal oxides or Berlin Blue, compounds of transition metals, e.g. Fe, Cu. Ni, Co, Cr, or organic compounds such as dyes or colour lakes.

In addition, the pigment according to the invention can also be coated with poorly soluble, firmly adhering, inorganic or organic colourants. Preference is given to the use of colour lakes and, especially, aluminium colour lakes. For that purpose an aluminium hydroxide layer is precipitated, which is, in a second step, laked by using a colour lake (DE-A-24 29 762 and DE 29 28 287).

Furthermore, the pigment according to the invention may also have an additional coating with complex salt pigments, especially cyanoferrate complexes (EP-A-141 173 and DE-A-23 13 332).

To enhance the weather and light stability the multiplayer silicon oxide flakes can be, depending on the field of application, subjected to a surface treatment. Useful surface treatments are, for example, described in DE-A-2215191, DE-A-3151354, DE-A-3235017, DE-A-3334598, DE-A-4030727, EP-A-649886, WO97/29059, WO99/57204, and U.S. Pat. No. 5,759,255. Said surface treatment might also facilitate the handling of the pigment, especially its incorporation into various application media.

In a particularly preferred embodiment of the present invention the $SiO_y$ flakes have a thickness of from 20 to 200 nm, especially from 40 to 150 nm, most preferred 60 to 120 nm. The $SiO_y$ flakes have a high plane-parallelism and a defined thickness in the range of ±30%, especially ±10% of the average thickness. It is presently preferred that the diameter of the flakes be in a preferred range of about 1 to 60 μm, especially 2 to 50 μm, with a more preferred range of about 5-40 μm. Thus, the aspect ratio of the flakes of the present invention is in a preferred range of about 4 to 1250 with a more preferred range of about 42 to 670. If a $TiO_2$ layer is deposited as a material of high refractive index, the $TiO_2$ layer has a thickness of 20 to 200 nm, especially 50 to 200 nm. The total thickness of the $TiO_2$-coated $SiO_y$ flakes is especially 150 to 450 nm. Starting, for example, from $SiO_y$ flakes (y=1.4 to 2.0) having a thickness of 90 nm ±30% it is possible to obtain red (ca. 73 nm), green (ca. 150 nm), or blue (ca. 130 nm) interference pigments by selecting the thickness of the $TiO_2$ layer. Due to the small thickness distribution of the $SiO_z$ flakes effect pigments result having a high color purity. The $SiO_z$ flakes may be oxidised using an oxygen-containing gas such as, for example, air at a temperature of at least 200° C., especially at above 400° C., preferably in the form of loose material, in a fluidised bed or by introduction into an oxidising flame, preferably at a temperature in the range from 500 to 1000° C., to form plane-parallel structures of $SiO_2$ (WO03/068868).

Alternatively, the $SiO_z$ flakes can be heated in an oxygen-free atmosphere such as, for example, argon and/or helium or under a vacuum of less than 13 Pa ($10^{-1}$ Torr) at a temperature of at least 400° C., especially at above 400° C., preferably in the form of loose material, in a fluidised bed, preferably at a temperature in the range from 900 to 1100° C., to form the silicon/silicon oxide flakes. The silicon/silicon oxide flakes can be used instead of the $SiO_z$ flakes as substrate for effect pigments (WO03/106569).

Alternatively, the process of the present invention can be used to produce porous $SiO_z$ flakes described in WO04/065295.

In a preferred embodiment of the present invention the porous $SiO_y$ flakes are obtainable by a process comprising the steps of:

a) vapor-deposition of an organic separating agent, especially pentaerythritol, onto a carrier to produce a separating agent layer, b) the simultaneous vapor-deposition of $SiO_y$ and an inorganic separating agent, especially NaCl, onto the separating agent layer (a), c) the separation of the $SiO_y$ flakes from the separating agents, wherein $0.70 \leq y \leq 1.95$, by dissolution in a solvent.

The process of the present invention can also be used to prepare the following pigments, described in (WO03/106569), comprising in this order:
(a2) a silicon/silicon oxide layer obtainable by heating a $SiO_{0.70-0.99}$ layer in an oxygen-free atmosphere at a temperature above 400° C.,
(b2) a silicon/silicon oxide layer obtainable by heating a $SiO_{1.00-1.8}$ layer in an oxygen-free atmosphere at a temperature above 400° C., and
(c2) a silicon/silicon oxide layer obtainable by heating a $SiO_{0.70-0.99}$ layer in an oxygen-free atmosphere at a temperature above 400° C. and optionally further layers.

The pigments comprising layers (a2), (b2) and (c2) are prepared by a process comprising the steps:
a) vapour-deposition of a separating agent onto a movable carrier to produce a separating agent layer,
b1) vapour-deposition of a $SiO_y$ layer onto the separating agent layer, wherein $0.70 \leq y \leq 0.99$,
b2) vapour-deposition of a $SiO_y$ layer, wherein $1.0 \leq y \leq 1.8$ onto the layer obtained in step (b1),
b3) vapour-deposition of a $SiO_y$ layer onto the layer obtained in step (b2),
c) dissolution of the separating agent layer in a solvent,
d) separation of the $SiO_{0.70-0.99}/SiO_{1.0-1.8}/SiO_{0.70-0.99}$ particles from the solvent, and
e) heating the $SiO_{0.70-0.99}/SiO_{1.0-1.8}/SiO_{0.70-0.99}$ particles in an oxygen-free atmosphere to a temperature above 400° C.

If step (b3) is omitted, unsymmetrical pigments comprising layers (a2) and (b2) are obtained.

The $SiO_{1.00-1.8}$ layer in step b) is formed preferably from silicon monoxide vapour produced in the vaporiser by reaction of a mixture of Si and $SiO_2$ at temperatures of more than 1300° C.

The $SiO_{0.70-0.99}$ layer in step b) is formed preferably by evaporating silicon monoxide containing silicon in an amount up to 20% by weight at temperatures of more than 1300° C.

It is possible, for example, for the weathering resistance to be increased by means of an additional protective layer, from 2 to 250 nm thick (preferably from 10 to 100 nm thick), of an inorganic dielectric having a refractive index $\leq 1.6$ (such as $SiO_2$, $SiO(OH)_2$ etc.).

In a preferred embodiment, the pigment comprises a further layer of a dielectric material having a "high" refractive index, that is to say a refractive index greater than about 1.65, which is applied to the entire surface of the above pigment (see above). The dielectric material is preferably a metal oxide, it being possible for the metal oxide to be a single oxide or a mixture of oxides, with or without absorbing properties, for example $CeO_2$, $TiO_2$, $ZrO_2$, $Fe_2O_3$, $Fe_3O_4$, $Cr_2O_3$ or ZnO, with $CeO_2$, $TiO_2$, and $ZrO_2$ being especially preferred.

The thickness of layer (b2) is generally 50 to 400 nm, especially 50 to 300 nm.

The thickness of layers (a2) and (c2) is generally 50 to 200 nm, especially 50 to 100 nm.

In addition, after heat-treatment in an oxygen-free atmosphere, the flakes can be subjected to oxidative heat treatment in air or some other oxygen-containing gas at a temperature of more than 200° C., preferably more than 400° C. and especially from 500 to 1000° C.

In an analogous manner pigments are available, comprising in this order:
(a3) a silicon/silicon oxide layer obtainable by heating a $SiO_{1.00-1.8}$ layer in an oxygen-free atmosphere at a temperature above 400° C.,
(b3) a silicon/silicon oxide layer obtainable by heating a $SiO_{0.70-0.99}$ layer in an oxygen-free atmosphere at a temperature above 400° C., and
(c3) a silicon/silicon oxide layer obtainable by heating a $SiO_{1.00-1.8}$ layer in an oxygen-free atmosphere at a temperature above 400° C. and optionally further layers (the thickness of layer (b2) is generally 50 to 400 nm, especially 100 to 300 nm; the thickness of layers (a3) and (c3) is generally 50 to 200 nm, especially 50 to 100 nm);

If, under industrial vacuums of a few $10^{-2}$ Pa, Si is vaporised (instead of $Si/SiO_2$ or SiO/Si) silicon oxides can be obtained which have an oxygen content of less than 0.70, that is to say $SiO_x$ wherein $0.03 \leq x \leq 0.69$, especially $0.05 \leq x \leq 0.50$, very especially $0.10 \leq x \leq 0.30$ (PCT/EP03/02196).

Accordingly, in a further preferred embodiment, the pigments comprise in this order:
(a4) a silicon/silicon oxide layer obtainable by heating a $SiO_{0.03-0.69}$ layer in an oxygen-free atmosphere at a temperature above 400° C.,
(b4) a silicon/silicon oxide layer obtainable by heating a $SiO_{1.00-1.8}$ layer in an oxygen-free atmosphere at a temperature above 400° C., and
(c4) a silicon/silicon oxide layer obtainable by heating a $SiO_{0.03-0.69}$ layer in an oxygen-free atmosphere at a temperature above 400° C., and optionally further layers, or the pigments comprise in this order:
(a5) a silicon/silicon oxide layer obtainable by heating a $SiO_{0.03-0.69}$ layer in an oxygen-free atmosphere at a temperature above 400° C.,
(b5) a silicon/silicon oxide layer obtainable by heating a $SiO_{0.70-0.99}$ layer in an oxygen-free atmosphere at a temperature above 400° C., and
(c5) a silicon/silicon oxide layer obtainable by heating a $SiO_{0.03-0.69}$ layer in an oxygen-free atmosphere at a temperature above 400° C., and optionally further layers.

Heating in the presence of oxygen at from 150 to 500° C., preferably from 175 to 300° C., unexpectedly results in a very thin, e.g. approximately 20 nm thick, superficial silicon dioxide layer, which represents a very convenient method of producing structures having the layer sequence $SiO_2/(a4)/(b4)/(c4)/SiO_2$, or $SiO_2/(a5)/(b5)/(c5)/SiO_2$.

The invention also relates to the use of the pigments based on the $SiO_z$ flakes according to the invention in paints, textiles, ink-jet printing, cosmetics, printing inks, plastics materials, coatings, especially in automotive finishes, in glazes for ceramics and glass, and in security printing (see, for example, WO04/035693).

The Examples that follow illustrate the invention without limiting the scope thereof. Unless otherwise indicated, percentages and parts are percentages and parts by weight, respectively.

EXAMPLES

Example 1

A layer of about 50 nm of pentaerythritol is vapor-deposited onto a metallic carrier in a vacuum chamber at a pressure of less than about $10^{-2}$ Pa. At the same pressure, the following materials are then vapor-deposited in succession: SiO, Al and SiO, thereby producing on the metal belt a film having the following layer structure:
SiO (30 nm)/Al (40 nm)/SiO (30 nm).

The separating agent is then dissolved in water, whereupon flakes separate from the substrate. The resulting suspension is concentrated by filtration at atmospheric pressure and rinsed several times with deionised water in order to remove any separating agent present. After drying, SiO-coated aluminum flakes displaying lustrous metallized colors and having a brighter appearance and a greater brilliance in comparison with aluminum flakes known from the prior art are obtained.

To increase fastness to weathering and light, the pigments, in the form of loose material, may be heated at 200° C. for 2 hours in an oven through which air heated to 200° C. is passed.

Example 2

Pentaerythritol is sublimed on a stainless steel substrate at a rate of 30 Angstroem/second. Then 80 nm of Al are flash evaporated on the freshly evaporated layer of pentaerythritol. The experimental parameters are summarized in Table 1. Then the substrate is removed from the vacuum chamber and the pentaerythritol is dissolved in water whereupon flakes separate from the substrate. The resulting suspension is concentrated by filtration at atmospheric pressure and rinsed several times with deionised water in order to remove any separating agent present. After drying, bright aluminum flakes are obtained.

| Sample | Pentaerythrite [nm] | Aluminum [nm] | Vacuum [Pa] | Comment |
|---|---|---|---|---|
| 1 | 150 | 80 | 0.008 | Bright |
| 2 | 450 | 80 | 0.008 | Bright |
| 3 | 450 | 80 | 0.015 | Bright |

The invention claimed is:

1. A process for the production of plane-parallel platelets, comprising the steps:
   a) vapour-deposition of a separating agent onto a carrier to produce a separating agent layer,
   b) vapour-deposition of at least one product layer onto the separating agent layer, and
   c) dissolution of the separating agent layer in a solvent and production of a suspension in which the at least one product layer is present in the form of plane-parallel platelets, wherein the separating agent is selected from the group consisting of pentaerythritol, DL-alanine, DL-valine, 2,6-diaminopurine, ascorbic acid, cyanuric acid, hexamethyltetramine, fumaric acid, and mixtures thereof.

2. The process according to claim 1, wherein the separating agent is selected from hexamethyltetramine.

3. The process according to claim 1, wherein the separating agent is pentaerythritol.

4. The process according to claim 1, wherein the plane-parallel platelets are aluminum flakes, comprising the steps:
   a) vapor-deposition of a separating agent onto a carrier to produce a separating agent layer,
   b) vapor-deposition of an Al layer onto the separating agent layer,
   c) dissolution of the separating agent layer in a solvent and
   d) separation of the aluminum flakes from the solvent; or
   the plane-parallel platelets are $SiO_z$, coated aluminum flakes, comprising
   (A1) a layer consisting of $SiO_z$,
   (B) a layer consisting of aluminum on the layer (A1) and
   (A2) a layer consisting of $SiO_z$, on the layer (B),
   wherein $0.70 \leq z \leq 2.0$, comprising the steps:
   a) vapor-deposition of a separating agent onto a carrier to produce a separating agent layer,
   b1) vapor-deposition of an $SiO_y$ layer onto the separating agent layer,
   b2) vapor-deposition of an Al layer onto the $SiO_y$ layer,
   b3) vapor-deposition of an $SiO_y$ layer onto the Al layer,
   c) dissolution of the separating agent layer in a solvent and
   d) separation of the $SiO_y$-coated aluminum flakes from the solvent, wherein $0.70 \leq y \leq 1.95$.

5. The process according to claim 4, wherein the separating agent is pentaerythritol and the solvent is water.

6. The process according to claim 1, wherein the plane-parallel platelets are $SiO_z$ flakes, wherein $0.70 \leq z \leq 2.0$, comprising the steps:
   a) vapor-deposition of a separating agent onto a carrier to produce a separating agent layer,
   b) vapor-deposition of an $SiO_y$ layer onto the separating agent layer,
   c) dissolution of the separating agent layer in a solvent and
   d) separation of the $SiO_y$ flakes from the solvent, wherein $0.70 \leq y \leq 1.95$.

7. The process according to claim 6, wherein the separating agent is pentaerythritol and the solvent is water.

* * * * *